(12) United States Patent
Koide et al.

(10) Patent No.: US 9,296,162 B2
(45) Date of Patent: Mar. 29, 2016

(54) LIGHT DIFFUSION FILM, METHOD OF SPECIFYING SURFACE SHAPE OF LIGHT DIFFUSION FILM, AND RECORDING MEDIUM ON WHICH SURFACE SHAPE SPECIFICATION PROGRAM IS RECORDED

(71) Applicants: MITSUBISHI GAS CHEMICAL COMPANY, INC., Tokyo (JP); MGC FILSHEET CO., LTD., Saitama (JP)

(72) Inventors: Koshi Koide, Tokyo (JP); Kishin Ozawa, Tokyo (JP); Yasutaka Fukunaga, Tokyo (JP)

(73) Assignees: MITSUBISHI GAS CHEMICAL COMPANY, INC., Tokyo (JP); MGC FILSHEET CO., LTD., Saitama (JP)

( * ) Notice: Subject to any disclaimer, the term of this patent is extended or adjusted under 35 U.S.C. 154(b) by 77 days.

(21) Appl. No.: 14/353,632

(22) PCT Filed: Oct. 23, 2012

(86) PCT No.: PCT/JP2012/077822
§ 371 (c)(1),
(2) Date: Apr. 23, 2014

(87) PCT Pub. No.: WO2013/062122
PCT Pub. Date: May 2, 2013

(65) Prior Publication Data
US 2014/0293618 A1    Oct. 2, 2014

(30) Foreign Application Priority Data
Oct. 24, 2011    (JP) .................................. 2011-233172

(51) Int. Cl.
*F21V 7/04* (2006.01)
*B29D 11/00* (2006.01)
(Continued)

(52) U.S. Cl.
CPC .... *B29D 11/00961* (2013.01); *B29D 11/00798* (2013.01); *F21V 5/002* (2013.01); *G02B 5/0221* (2013.01); *G02B 5/0278* (2013.01); *G02F 1/133606* (2013.01)

(58) Field of Classification Search
CPC .............. B29D 11/00798; F21V 5/002–5/005; G02B 5/02; G02B 5/0205; G02B 5/021; G02B 5/0221; G02B 5/0278; G02F 1/133606
USPC ................................................... 362/605, 330
See application file for complete search history.

(56) References Cited

U.S. PATENT DOCUMENTS

| 2010/0033825 A1 | 2/2010 | Kato et al. |
| 2010/0136287 A1 | 6/2010 | Kato et al. |

(Continued)

FOREIGN PATENT DOCUMENTS

| CN | 102073080 A | 5/2011 |
| JP | 2005-227407 | 8/2005 |

(Continued)

OTHER PUBLICATIONS

Search Report issued by Chinese patent office in Patent Application No. 201280051367.5, dated Sep. 15, 2015, along with an English translation thereof.

(Continued)

*Primary Examiner* — Jason Moon Han
(74) *Attorney, Agent, or Firm* — Greenblum & Bernstein, P.L.C.

(57) ABSTRACT

The present invention solves glare of an embossed matte film of a conventional product produced and sold by the applicant of the present application, and provides a light diffusion film and the like having a surface shape of an irregular pattern that significantly suppresses the glare even when an LED light source is used and also maintains the good optical characteristics. The following is believed sufficient for maintaining good optical characteristics of an embossed matte film and also for solving the glare. To maintain the optical characteristics, the surface shape was defined by use of an inclination angle histogram profile of an embossed surface. In order to solve the glare, the size of unit patterns which make up an entire pattern and do not cause glare was defined by use of the value of the average length RSm of the roughness curve element of the embossed surface.

1 Claim, 15 Drawing Sheets

APPROVED CONTOUR MAP OF THE EMBOSSED
SURFACE OF THE EXAMPLE

(51) Int. Cl.
*G02B 5/02* (2006.01)
*F21V 5/00* (2015.01)
*G02F 1/1335* (2006.01)

(56) References Cited

U.S. PATENT DOCUMENTS

| | | |
|---|---|---|
| 2012/0008206 A1 | 1/2012 | Haga et al. |
| 2012/0257410 A1 | 10/2012 | Yokota et al. |

FOREIGN PATENT DOCUMENTS

| | | |
|---|---|---|
| JP | 2005-321451 | 11/2005 |
| JP | 2006-010724 A | 1/2006 |
| JP | 2007-264113 A | 10/2007 |
| JP | 2009-53622 | 3/2009 |
| JP | 2009-230155 A | 10/2009 |
| JP | 2011-186386 | 9/2011 |
| JP | 2011-186386 A | 9/2011 |
| JP | 2010-20268 | 1/2014 |
| WO | 2008/032848 | 3/2008 |
| WO | 2008/081953 | 7/2008 |
| WO | 2011/074647 | 6/2011 |

OTHER PUBLICATIONS

Search report from International Search Report in PCT/JP2012/077822, mail date is Feb. 5, 2013.

European Search Report for European Patent Application No. 12842756.4 mailed Jun. 22, 2015.

APPROVED CONTOUR MAP OF THE EMBOSSED SURFACE OF THE CONVENTIONAL PRODUCT

APPROVED CONTOUR MAP OF THE EMBOSSED SURFACE OF THE EXAMPLE

CONTOUR MAP OF EQUIVALENT INCLINATION ANGLE OF THE EMBOSSED SURFACE OF THE CONVENTIONAL PRODUCT

CONTOUR MAP OF EQUIVALENT INCLINATION ANGLE OF THE EMBOSSED SURFACE OF THE EXAMPLE

FIG.10
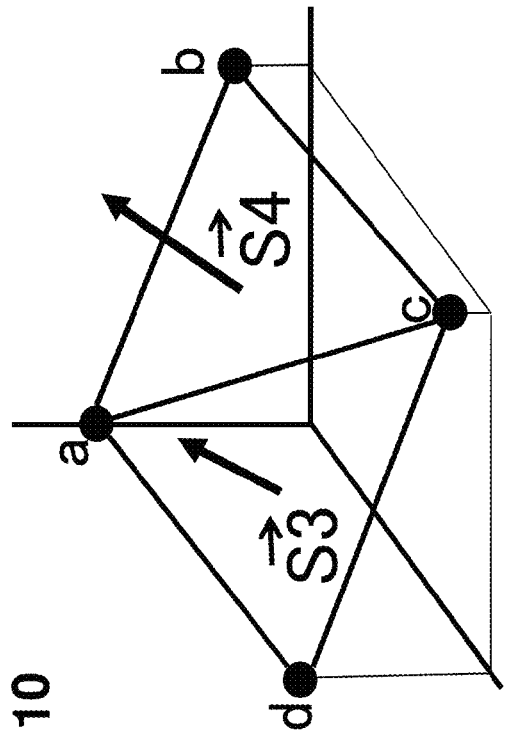
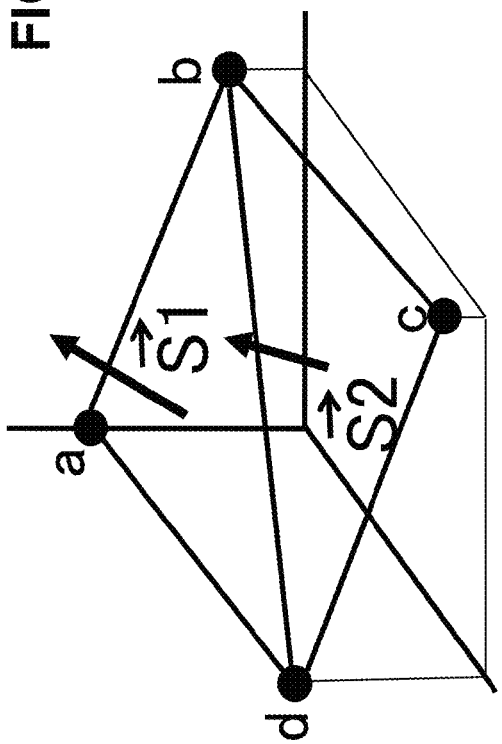
$\vec{S1} = \vec{ab} \times \vec{ad}$
$\vec{S2} = \vec{cb} \times \vec{cd}$
$\vec{S3} = \vec{dc} \times \vec{da}$
$\vec{S4} = \vec{bc} \times \vec{ba}$
ALGORITHM FOR CALCULATING THE INCLINATION ANGLES OF TINY AREAS

FIG.15

SOURCE CODES CREATED BY C LANGUAGE FOR CREATING DISTRIBUTION OF NUMBER OF TIMES OF THE INCLINATION ANGLES

LIGHT DIFFUSION FILM, METHOD OF SPECIFYING SURFACE SHAPE OF LIGHT DIFFUSION FILM, AND RECORDING MEDIUM ON WHICH SURFACE SHAPE SPECIFICATION PROGRAM IS RECORDED

TECHNICAL FIELD

The present invention relates to displays such as liquid crystal display devices, the field of optical devices and the field of illumination, and specifically to a light diffusion film or the like produced by embossing a surface of a resin film substrate.

BACKGROUND ART

Various types of light diffusion sheet/films used for backlight optical systems of liquid crystal televisions (hereinafter, referred to as "TV(s)") are provided for the purpose of diffusing light from a light source as uniformly as possible at a designed luminous intensity distribution characteristic, so that an image of a lamp used as the light source is not directly viewed when such a liquid crystal TV is viewed. In order to increase the light utilization factor, a light diffusion film having a high total light transmittance is desired. As a value representing the degree of diffusion of light, "haze value" is widely recognized and used. In order to discuss the degree of diffusion of light more fundamentally, the concept of "luminous intensity distribution characteristic" is used. The "luminous intensity distribution characteristic" refers to the magnitude of luminous intensity in accordance with the output angle of light with respect to an optical film. In general, the luminous intensity distribution characteristic may be different even when the haze value is the same. Conversely, once the luminous intensity distribution characteristic is determined, the haze value is uniquely determined. The luminous intensity distribution characteristic of a diffusion sheet/film is an important characteristic which significantly influences the viewing angle of a display.

Various types of existing diffusion sheets/films include, for example, a diffusion sheet/film produced by fixing acrylic or glass bead filler on a film substrate of polyethylene terephthalate (hereinafter, referred to as "PET") with a binder resin, a diffusion sheet/film produced by diffusing diffusion fillers in a resin film substrate, a diffusion sheet/film produced by embossing a surface of a resin film, and the like. From these types of diffusion sheets/films, an appropriate diffusion sheet/film suitable for a desired optical characteristic is selected.

A conventional light diffusion film produced and sold by the applicant of the present application (trade name: FE-2000M01; hereinafter, referred to as the "conventional product") is widely used for backlight units of liquid crystal TVs. This conventional product is a diffusion film produced by embossing a surface of a resin film described above, and the resin film is formed of polycarbonate (hereinafter, referred to as "PC"). This conventional product is used as follows most widely. A surface of another optical film having no useful optical characteristics and a rear surface of this conventional product are bonded together with a pressure sensitive adhesive film.

Recently, the system for mass-producing high luminance white light emitting diodes (hereinafter, referred to as "LEDs") has been almost established, and the cost of LEDs themselves has been lowered. For these reasons, TV manufacturers have started using LEDs instead of conventional cold cathode fluorescent lamps (hereinafter, referred to as "CCFLs"). From a comprehensive point of view, use of LEDs instead of CCFLs reduces the power consumption of liquid crystal TVs. Use of LEDs instead of CCFLs also influences the quality of light as well as the power consumption. CCFLs, which emit light by illuminating a fluorescent material attached to the entire inner surface of a cylindrical glass tube with ultraviolet, act as so-called surface light sources (assembly of an infinite number of point light sources). By contrast, LEDs act as point light sources.

CITATION LIST

Patent Literature

Patent Document 1: International Publication No. 2008/032848
Patent Document 2: International Publication No. 2008/081953
Patent Document 3: Japanese Laid-Open Patent Publication No. 2005-321451
Patent Document 4: Japanese Laid-Open Patent Publication No. 2010-020268

SUMMARY OF INVENTION

Technical Problem

When LEDs are used instead of CCFLs for light sources, a resin film as described above having a surface of a specific geometrical shape may cause a problem due to the surface shape thereof. Specifically, in the case of a diffusion film as described above produced by fixing transparent bead filler on a PET film substrate with a binder resin, each of the bead filler acts as a convex lens. Therefore, a point real image is formed immediately above each bead filler by light propagated straight from each of the LEDs. When the lenses each have a large diameter, bright points are formed locally. These bright points are visually recognized as glare (bright grains). In the case of a diffusion film as described above produced by embossing a resin film substrate also, the embossed film is dotted with lens shapes, which are visually recognized as glare as a whole when the lens shapes each have a large diameter. Hereinafter, this problem will be referred to as "LED glare problem".

When a light diffusion film having no good luminous intensity distribution characteristic is used although the "LED glare problem" is solved, a problem such that the viewing angle of the display is not sufficient may be caused.

The present invention has an object of providing a film surface shape with an irregular pattern that solves the "LED glare problem" of a light diffusion film of the conventional product and significantly suppresses the glare even when an LED light source is used and also has the optical characteristics of the conventional product (luminous intensity distribution characteristic for all the angles of incidence, total light transmittance, etc.).

Solution to Problem

The present inventors analyzed the mechanism for solving the "LED glare problem" while maintaining good optical characteristics of the conventional product, and paid attention to the following points as sufficient conditions for maintaining the good optical characteristics of a matte film (light diffusion film) and also solving the "LED glare problem". Namely, the present inventors paid attention to the histogram profile (distribution of the number of times) of an inclination angle of a tiny area on a surface of an embossed light diffusion film in order to maintain the good optical characteristics, and paid attention to the value of the average length RSm of the roughness curve element of the surface shape of the embossed light diffusion film in order to solve the "LED glare problem". More specifically, the present invention provides the following light diffusion film, method of defining the surface shape of the light diffusion film, and medium for storing a program for the method.

<1> A light diffusion film formed of polycarbonate that has an irregular three-dimensional surface shape for diffusing light due to refraction:

an average length RSm of a roughness curve element of a surface of the film has a value in the range of 70 μm or less (measured in conformity to JIS B 0601 (2001) until the RSm value is asymptotic, with a cutoff value being 0.8 mm), three-dimensional data is measured on the surface at a film planer direction (XY direction) pitch of 1 μm and a film thickness direction pitch (Z direction) of 0.01 μm or less, a virtual plane is defined by three points adjacent to one another on the XY plane, an inclination angle of the virtual plane is an angle formed by the normal vector to the virtual plane and the normal vector to the film substrate surface, data zones are set at 2.5° intervals, a number of times in each data zone is obtained from data of the inclination angle of the virtual plane obtained from the three-dimensional data, and a frequency of which unit is a percentage (%) is calculated as a ratio of the number of times in each data zone to the total sum of the numbers of times in all the data zones, an asymptotic value by large area data of the frequency is:

9% or greater and 16% or less in a data zone of 0° or greater and less than 2.5°, 18% or greater and 28% or less in a data zone of 2.5° or greater and less than 5.0°, 21% or greater and 24% or less in a data zone of 5.0° or greater and less than 7.5°, 14% or greater and 18% or less in a data zone of 7.5° or greater and less than 10.0°, 8% or greater and 13% or less in a data zone of 10.0° or greater and less than 12.5°, 4% or greater and 8% or less in a data zone of 12.5° or greater and less than 15.0°, 2% or greater and 5% or less in a data zone of 15.0° or greater and less than 17.5°, 1% or greater and 3% or less in a data zone of 17.5° or greater and less than 20.0°, 2% or less in a data zone of 20.0° or greater and less than 22.5°, 2% or less in a data zone of 22.5° or greater and less than 25.0°, 1% or less in a data zone of 25.0° or greater and less than 27.5°, 1% or less in a data zone of 27.5° or greater and less than 30.0°, 1% or less in a data zone of 30.0° or greater and less than 32.5°, 0.5% or less in a data zone of 32.5° or greater and less than 35.0°, 0.5% or less in a data zone of 35.0° or greater and less than 37.5°, 0.3% or less in a data zone of 37.5° or greater and less than 40.0°, 0.2% or less in a data zone of 40.0° or greater and less than 42.5°, and 0.1% or less in a data zone of 42.5° or greater and less than 45.0°.

<2> A method of defining a surface shape for governing luminous intensity distribution characteristics of a light diffusion film, the method comprising an inclination angle distribution determination algorithm by which, where three-dimensional shape data on a surface of the film includes a film planer direction (XY direction) pitch and a film thickness direction pitch (Z direction), a virtual plane is defined by three points adjacent to one another on the XY plane, and an inclination angle of the virtual plane is an angle formed by the normal vector to the virtual plane and the normal vector to the film substrate surface, data of the inclination angle of the virtual plane is obtained from the three-dimensional shape data;

data zones of the inclination angle data are set at prescribed inclination angle intervals;

a ratio of the number of times in each data zone to the total sum of the numbers of times in all the data zones is calculated; and an inclination angle distribution of the surface of the film is determined based on asymptotic values by large area data of the ratio.

<3> A computer-readable recording medium storing a program for allowing a computer to execute a method of defining a surface shape for governing luminous intensity distribution characteristics of a light diffusion film, wherein:

the method includes an inclination angle distribution determination algorithm by which, where three-dimensional shape data on a surface of the film includes a film planer direction (XY direction) pitch and a film thickness direction pitch (Z direction), a virtual plane is defined by three points adjacent to one another on the XY plane, and an inclination angle of the virtual plane is an angle formed by the normal vector to the virtual plane and the normal vector to the film substrate surface, data of the inclination angle of the virtual plane is obtained from the three-dimensional shape data;

data zones of the inclination angle data are set at prescribed inclination angle intervals;

a percentage of the number of times in each data zone with respect to the total sum of the numbers of times in all the data zones is calculated; and an inclination angle distribution of the surface of the film is determined based on asymptotic values by large area data of the percentage.

<4> The method of defining a surface shape of a light diffusion film according to claim 2, wherein the film planer direction (XY direction) pitch is 1 μm, the film thickness direction pitch (Z direction) is 0.01 μM or less, and the data zones are set at 2.5° intervals of the inclination angle.

<5> The computer-readable recording medium according to claim 3, wherein in the method of defining a surface shape of a light diffusion film, the film planer direction (XY direction) pitch is 1 μm, the film thickness direction pitch (Z direction) is 0.01 μm or less, and the data zones are set at 2.5° intervals of the inclination angle.

BRIEF DESCRIPTION OF DRAWINGS

FIG. 10 shows an algorithm for calculating inclination angles of tiny areas.

FIG. 15 shows source codes of the C programming language for calculating the distribution of the number of times of the inclination angle.

DESCRIPTION OF EMBODIMENTS

1. Polycarbonate Resin

A light diffusion film according to the present invention is formed of a polycarbonate resin.

2. Production of a Light Diffusion Film

For a method for producing a resin film according to the present invention, a common melt extrusion molding device is used. For example, a melt resin film which is melt by an extruder and extruded from a T-die is nipped by a first cooling roll having rubber elasticity and a metal second cooling roll having an embossed surface to provide a surface of the film with a rugged shape, and the film is drawn by a metal third cooling roll and a drawing roll which are located on the downstream side.

3. Rugged Shape of the Film Surface

Average Length RSm of a Roughness Curve Element

The average length RSm of the roughness curve element of the light diffusion film according to the present invention is measured in conformity to the Japanese Industrial Standards Committee JIS B 0601 (2001). As a condition of the measurement, the cutoff value is, for example, 0.8 mm. Since the target of measurement is an irregular pattern, the length to be measured needs to be sufficiently long for the RSm to be an asymptotic value. In the case of a light diffusion film in an example described later, it was confirmed that the RSm value was almost asymptotic when the measured length was 50 mm. As a size of the unit pattern is larger, the length to be measured sufficient for the RSm value to be asymptotic is longer. The average length RSm described later is a value obtained by the measurement performed under such a condition. The average length RSm of the roughness curve element is measured by use of for example, a non-contact three-dimensional measurement device.

Hereinafter, the present invention will be described in detail with reference to the figures.

Reduction of Glare

Figure 1:
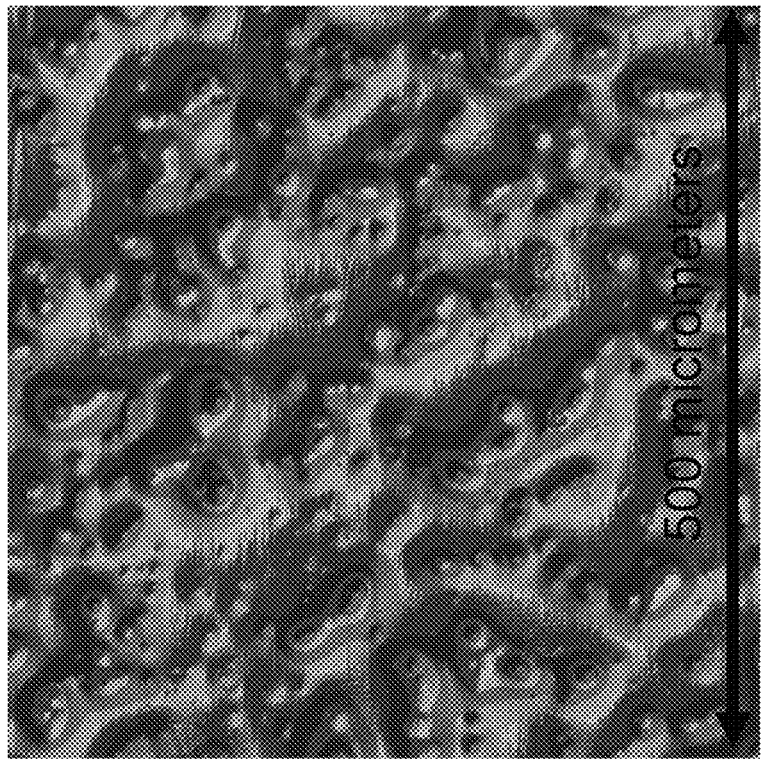
FIG. 1 shows approved contour map of an embossed surface of a conventional product.

FIG. 1 shows a three-dimensional shape of an embossed surface of a light diffusion film of the conventional product. More specifically, FIG. 1 shows an image of approved contour map created by use of actual data obtained by measurement performed on a 500 μm-square area at a longitudinal and lateral pitch of 0.5 μm and a height precision of 0.01 μm. Orange portions have a greatest height, and the height is decreased in the order of orange, sky blue, purple, yellowish green, red and blue (among the portions of each color, a brighter portion has a greater height).

Figure 2:
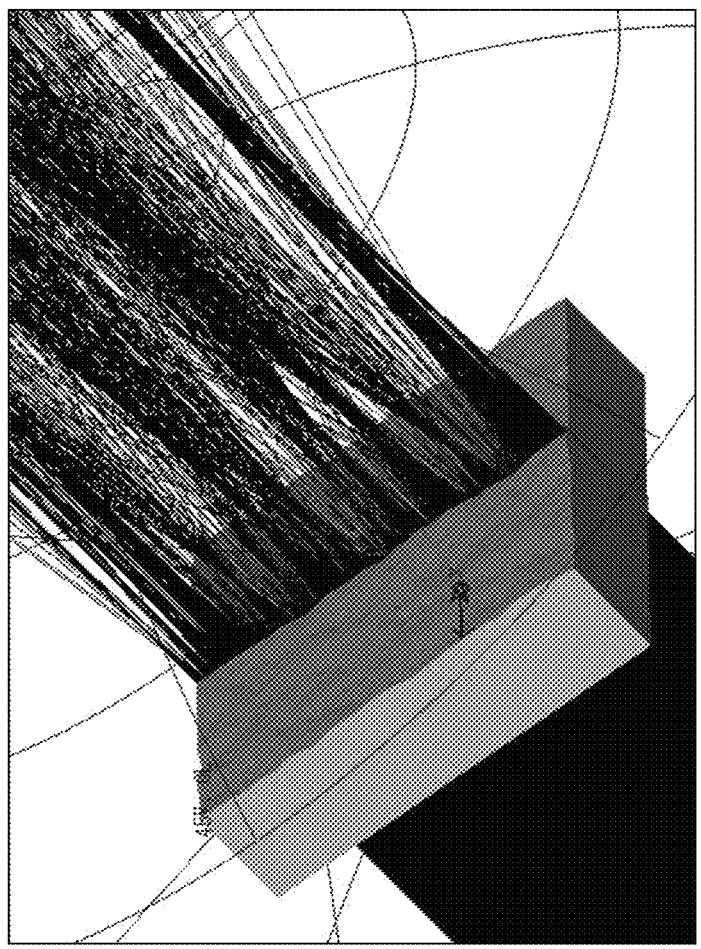
FIG. 2 shows results of ray-tracing performed on the conventional product.

FIG. 2 shows the results of ray-tracing calculation performed based on the three-dimensional shape of the embossed surface of the light diffusion film of the conventional product shown in FIG. 1. Plate-like (two-dimensional) collimated rays (parallel rays) were incident on a rear surface of the embossed film at an angle of incidence of 0 degrees (incident perpendicularly). A ray-tracing calculation model described in this specification was obtained as follows. An embossed matte film formed of polycarbonate (PC) and having a thickness of 130 μm was used. The rear surface of the embossed film was flat, the front and rear surfaces of the embossed matte film had a Fresnel loss as an optical characteristic, an edge portion had a mirror surface, and the ambient atmosphere was air. Under these conditions, the wavelength dispersion of the refractive index of PC was defined. The spectrum of the incident collimated rays was defined as the spectrum of light from a C light source. The number of rays incident on the rear surface of the embossed film was 1000.

As is clear from FIG. 2, a specific local site of the embossed surface has a convex lens structure. It is seen that the collimated rays (parallel rays) are converged and a point real image having a slight aberration is formed immediately above the embossed surface. This causes glare (bright grains). The light rays from each LED are considered to be a spherical wave, and therefore, a position at which the point real image is formed in this case is farther from the embossed surface than a position at which the point real image is formed by collimated rays. In the case where the LED (not shown) is optically far from the embossed surface, the light rays from the LED can be considered to be generally collimated light rays. In the case where the light source is a CCFL, the light source is an assembly of an infinite number of point light sources. Therefore, collimated rays propagated in an infinite number of directions are incident on each convex lens. This provides a state where an infinite number of dark point images, not bright point images, are coupled to one another. In this case, a local bright point is not formed.

Figure 3:
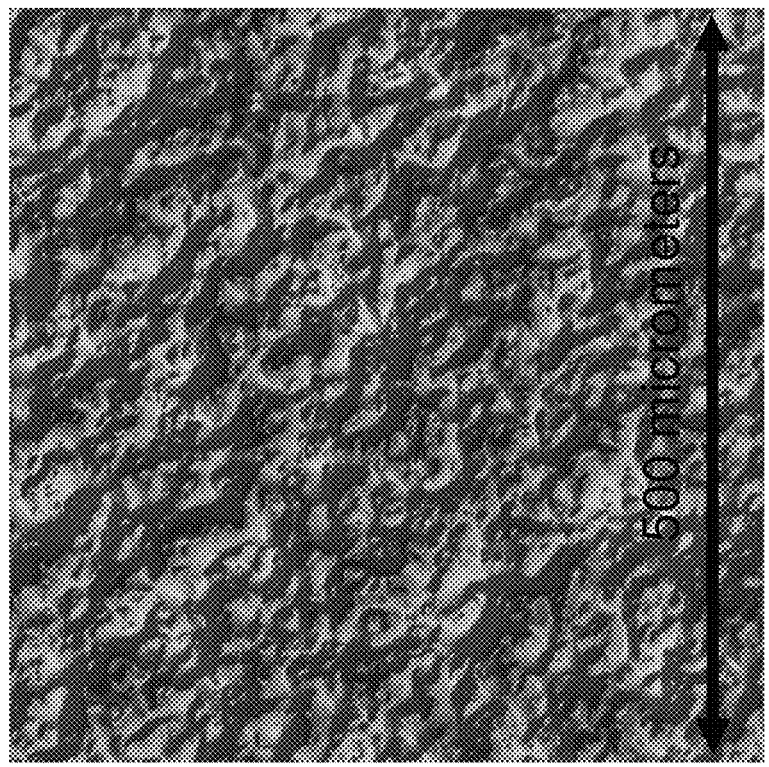
FIG. 3 shows approved contour map of an embossed surface of an example.

FIG. 3 shows an image of approved contour map of a three-dimensional shape of an embossed surface of an embossed matte film in an example of the present invention. The approved contour map was created by use of actual data obtained by measurement performed on a 500 μm-square area at a longitudinal and lateral pitch of 0.5 μm and a height precision of 0.01 μm. Light pink portions have a greatest height, and the height is decreased in the order of light pink, lavender, orange, sky blue, purple, yellowish green and red (among the portions of each color, a brighter portion has a greater height).

Figure 4:
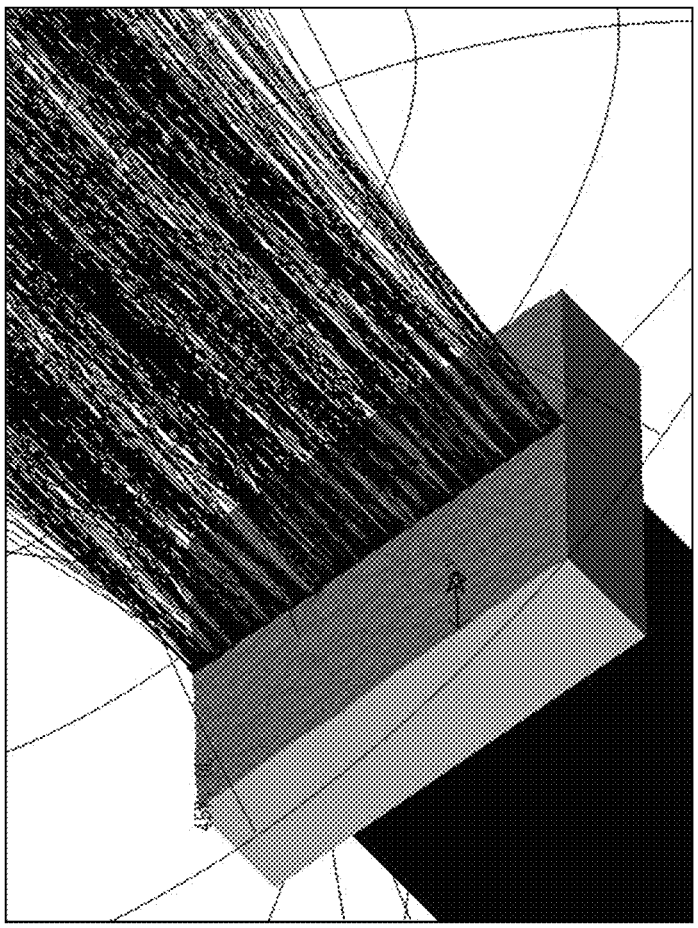
FIG. 4 shows results of ray-tracing performed on the example.

FIG. 4 shows the results of ray-tracing calculation performed based on the three-dimensional shape of the embossed surface of the light diffusion film in the example of the present invention shown in FIG. 3. Plate-like (two-dimensional) collimated rays (parallel rays) were incident on a rear surface of the embossed film at an angle of incidence of 0 degrees. The number of rays incident on the rear surface of the embossed film was 1000. As is clear from FIG. 4, as compared with FIG. 2, the number of point real images is larger and the number of rays forming each point real image is smaller. In other words, there are a larger number of dark real images, which are spatially averaged and are not recognized as glare (bright grains).

When light from an LED light source was actually incident on the rear surface of the embossed film, glare was recognized in the conventional product, whereas glare was not recognized in the example of the present invention. In order to solve the "LED glare problem", it is considered to be important that the size of the convex lenses formed on the embossed surface (size of the unit patterns which make up the entire pattern) is small.

The RSm which was calculated from a one-dimensional cross-sectional profile (one-dimensional geometrical shape) of the conventional product shown in FIG. 1 was about 100 μm. By contrast, the RSm which was calculated from a one-dimensional cross-sectional profile of the embossed matte film in the example shown in FIG. 3 was about 50 μm. The shape shown in FIG. 3 is one example. Therefore, in order to find the border value, namely, how small the RSm should be to reduce glare, samples with various RSm values were produced and glare was visually evaluated (see Table 1). As a result, the border RSm value was found to be around 70 μm. Therefore, it is considered that the "LED glare problem" of the light diffusion film can be solved by setting the RSm value to 70 μm or less.

liquid for PC. As is clear from FIG. 5, the luminous intensity distribution characteristic of the example is equivalent to that of the conventional product. The matte haze value of the conventional product (in the range of the product specifications) is 45 to 55%, whereas the matte haze value of the example is 52%. The "matte haze value" refers to the haze value derived only from the emboss pattern on the surface in the state where the haze of the rear surface of the embossed film is eliminated by use of a glass plate and a refractive index matching liquid for PC as in the case of the measurement of the luminous intensity distribution characteristic.

For measuring the matte haze value also, collimated rays were incident perpendicularly on the rear surface of the embossed film. The total light transmittance was 89% in both of the conventional product and the example. For measuring the total light transmittance also, collimated rays were incident perpendicularly on the rear surface of the embossed film. Based on the above, the example of the present invention is considered to provide a novel embossed matte film having no glare while succeeding the luminous intensity distribution characteristic of the conventional product. However, this is realized only when the light is incident perpendicularly on the rear surface of the embossed film. In actual backlight units of liquid crystal TVs, light may be incident on the embossed matte film obliquely as well as perpendicularly. Therefore, in order to allow the film to have the luminous intensity distribution characteristic of the conventional product at all the angles of incidence, the entire distribution of the inclination angles of tiny areas on the embossed matte surface needs to be considered.

TABLE 1

|  |  | Observer No. | | | | |
| --- | --- | --- | --- | --- | --- | --- |
|  |  | 1 | 2 | 3 | 4 | 5 |
| RSm value of light diffusion film (micrometers) | 100 | Bad | Bad | Bad | Bad | Bad |
|  | 90 | Bad | Bad | Bad | Bad | Bad |
|  | 80 | Bad | Bad | Normal | Normal | Excellent |
|  | 70 | Normal | Excellent | Excellent | Excellent | Excellent |
|  | 60 | Excellent | Excellent | Excellent | Excellent | Excellent |
|  | 50 | Excellent | Excellent | Excellent | Excellent | Excellent |

Figure 5:
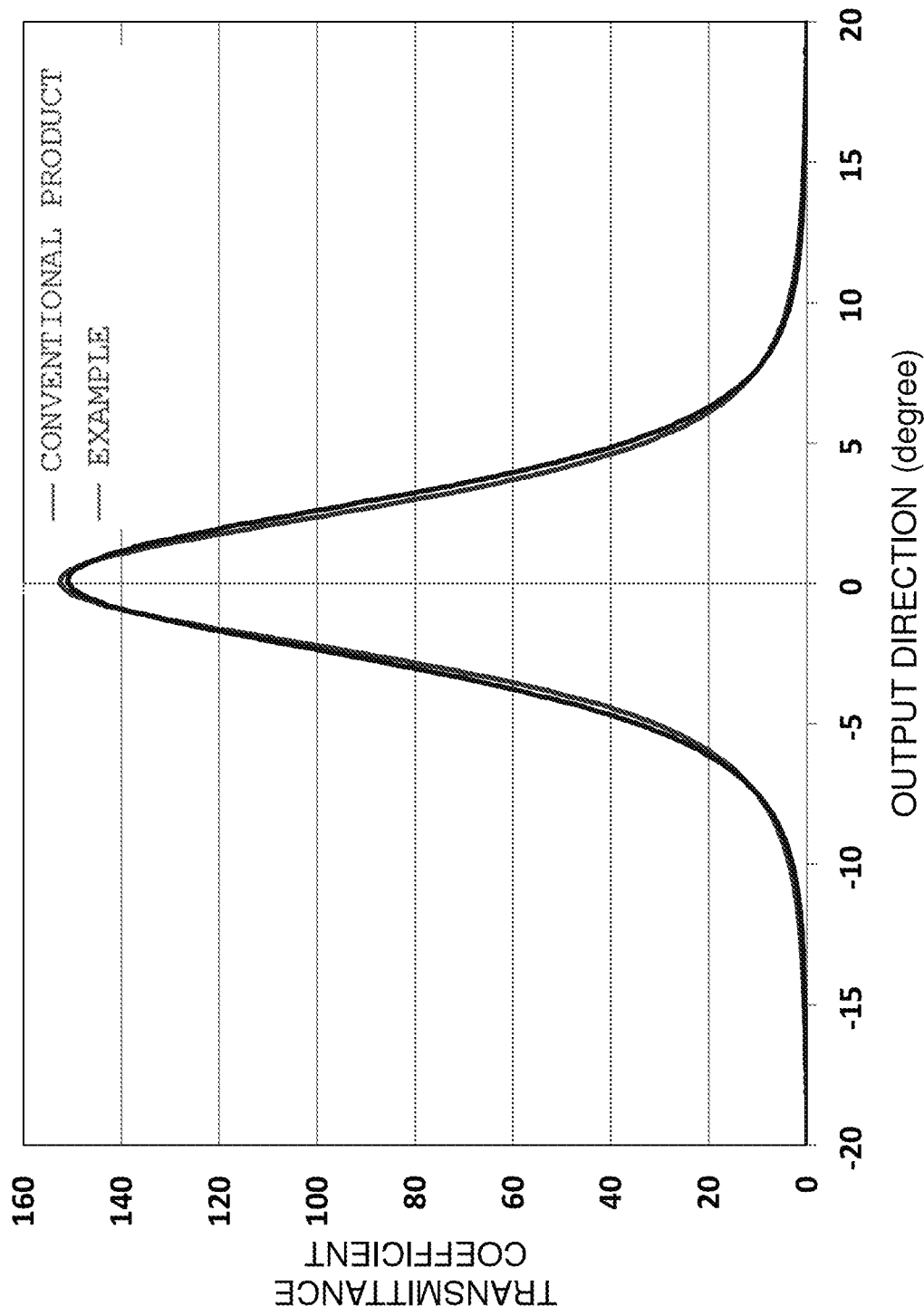
FIG. 5 shows luminous intensity distribution characteristics of the conventional product and the example.

Item and evaluation
Excellent: Glare is not disturbing
Normal: Glare is slightly disturbing
Bad: Glare is disturbing Succession of Optical Characteristics of the Conventional Product FIG. 5 shows actually measured values of luminous intensity distribution on the embossed surface of the light diffusion film of the conventional product shown in FIG. 1 and the embossed surface of the embossed matte film in the example according to the present invention shown in FIG. 3. These values are regulated by use of a light transmissive perfect diffusion plate of which material is opal. The regulation was performed such that the total light transmittance of the light transmissive perfect diffusion plate would be 100% (transmissive type of screen gain of the projector-reflective screen evaluation value). On both of the films of the conventional product and the example, collimated rays were incident perpendicularly on the rear surface of the embossed film. Before the measurement was performed, the emboss pattern formed on each rear surface due to a production-related reason (transfer of the pattern on the surface of the first cooling roll having rubber elasticity) was optically eliminated by bonding a glass plate to the rear surface with a refractive index matching Light is refracted by the Snell's law at an optical boundary face having a refractive index difference. Therefore, for the optical functions of the present invention, the distribution of inclination of the interface (ratio of occurrence of inclination angles), not the height of the surface of the embossed matte surface, is important. In probing which is commonly performed for roughness measurement, the inclination of a tiny portion of the profile of a one-dimensional geometric cross-sectional shape obtained by scanning the embossed matte film surface one-dimensionally (spatial first-order differential of the profile) is not an inclination of the surface at which the light is refracted but is an inclination of the geometric cross-sectional shape. The inclination of a cross-sectional shape is not an inclination of an optical surface. In order to obtain the inclination of the optical surface adapted to the Snell's law, information on the three-dimensional, essential surface shape shown as examples in FIG. 1 or FIG. 3, not the information on the inclination of the cross-sectional shape, is necessary.

Figure 6:
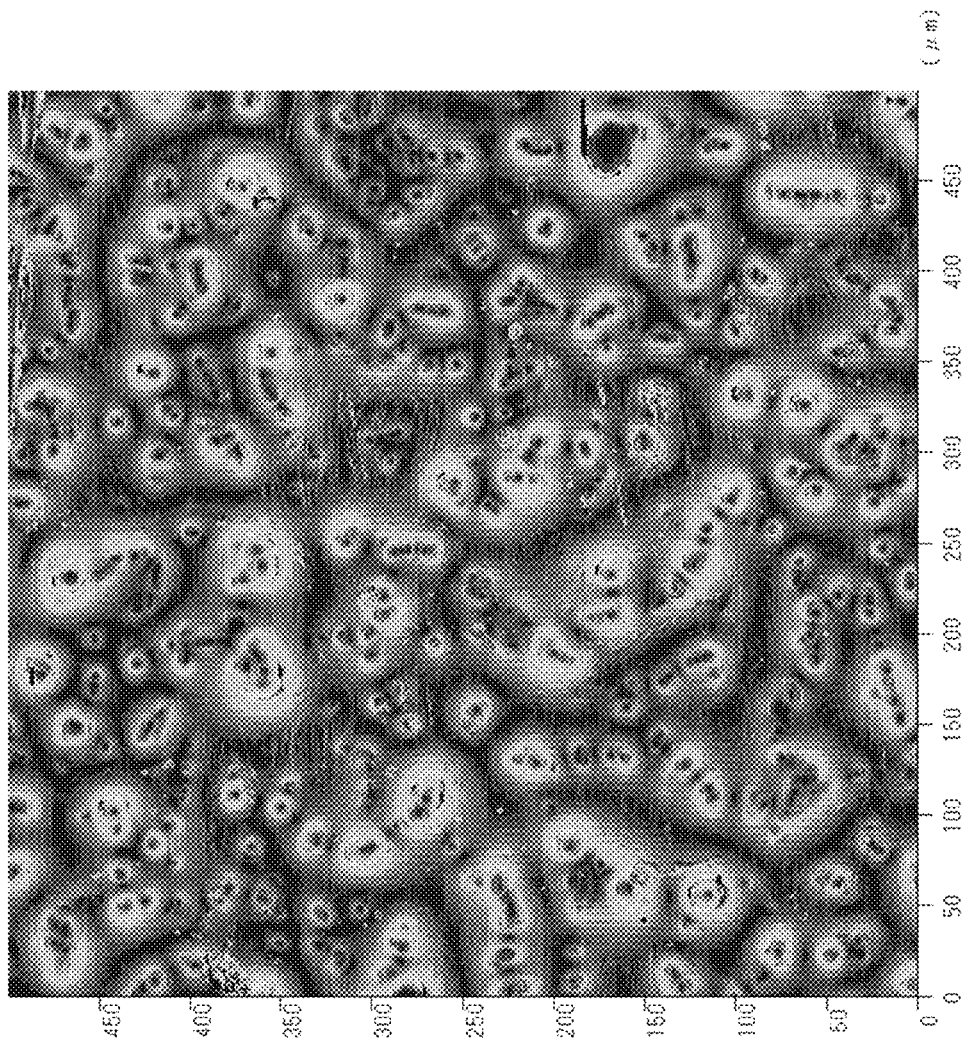
FIG. 6 shows contour map of equivalent inclination angle of the embossed surface of the conventional product.
Figure 11:
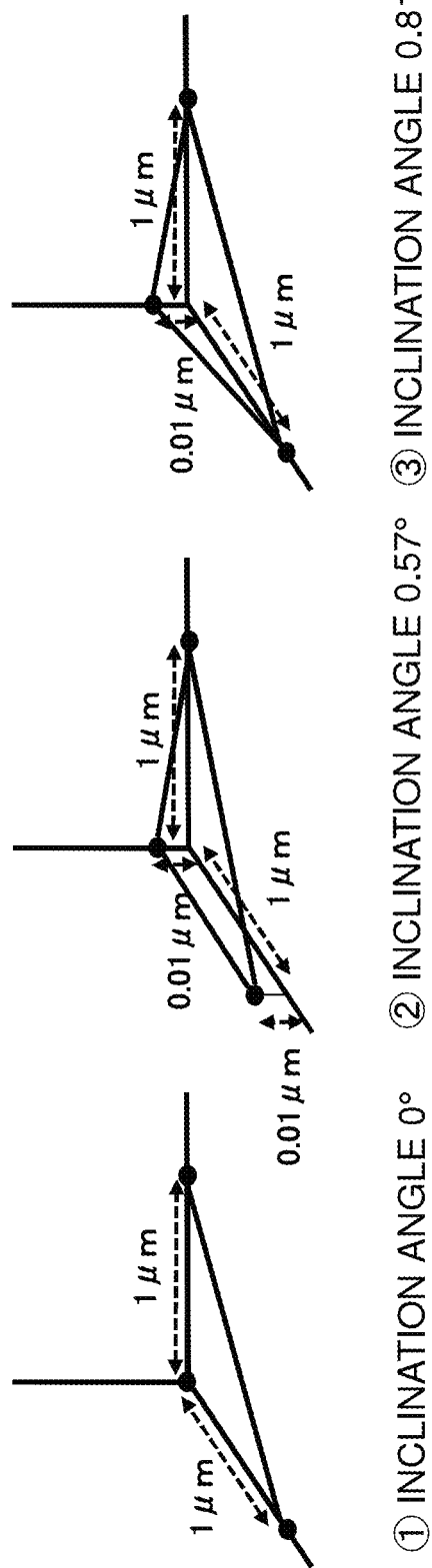
FIG. 11 shows inclination angles of interfaces when the resolution in the height direction is 0.01 μm and the longitudinal and lateral pitch is 1 μm.

FIG. 6 is a diagram showing contour map of equivalent inclination angle of the embossed surface of the light diffusion film of the conventional product shown in FIG. 1. Usually, three-dimensional shape data is output as a digital value. Therefore, the measurement data is represented by discrete values. Thus, when the measurement pitch (longitudinal and lateral pitch) in the planar direction (XY direction) of the three-dimensional shape of the surface is too small, correct information on the surface having a small inclination angle is not obtained. Attention should be paid so that the measurement pitch is not too small. When the resolution in the height direction is 0.01 μm and the longitudinal and lateral pitch is 1 μm, possible discretized inclination angles are, from the smallest value, 0°, 0.57°, 0.81°, 1.15°, 1.28°, 1.62°, 1.72°, 1.81°, . . . . FIG. 11 shows the smallest to the third smallest inclination angles among these inclination angles.

Figure 12:
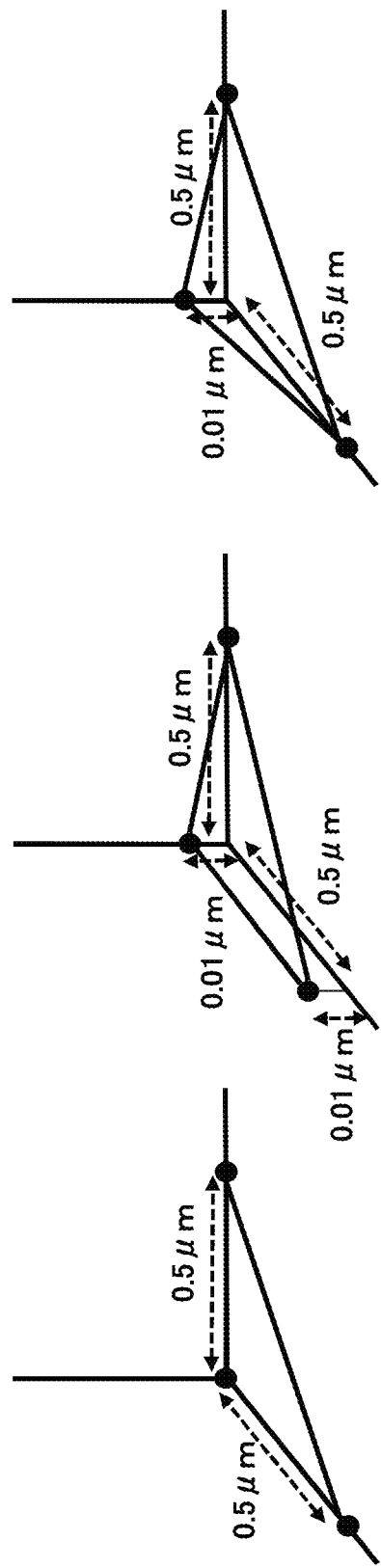
FIG. 12 shows inclination angles of interfaces when the resolution in the height direction is 0.01 μm and the longitudinal and lateral pitch is 0.5 μm.

When the resolution in the height direction is 0.01 μm as above and the longitudinal and lateral pitch is 0.5 μm, discretized inclination angles are, from the smallest value, 0°, 1.15°, 1.28°, 1.62°, 2.29°, 2.56°, 3.24°, 3.43°, 3.62°, . . . . FIG. 12 shows the smallest to the third smallest inclination angles among these inclination angles. When the longitudinal and lateral pitch is small as above, the discretization degree of the inclination angles which may be assumed by areas having small inclination angles (degree of possible interval between adjacent values) is high. In this case, the behavior of the areas having small inclination angles is not acquired. By contrast, when the longitudinal and lateral pitch is too large, inclination angle information on patterns smaller than the longitudinal and lateral pitch is not obtained. The emboss matte film according to the present invention uses the refraction of light. Therefore, the longitudinal and lateral pitch needs to be at least 1 μm, which is equal to or longer than the wavelength of the visible light (0.38 to 0.78 μm). For discussing the inclination angle of the diffusion film according to the present invention, data on the three-dimensional shape obtained with a resolution in the height direction of 0.01 μm and a longitudinal and lateral pitch of 1 μm was used. The resolution in the height direction may be smaller than 0.01 μm.

FIG. 6 was created as follows. From the three-dimensional shape data of the conventional product used for creating FIG. 1 (measured area: 500 μm square; longitudinal and lateral pitch: 0.5 μm; and precision in the height direction: 0.01 μm; therefore, the number of height data pieces: 1001×1001), every other data piece was removed, so that the longitudinal and lateral pitch was 1 μm (measured area: 500 μm square; longitudinal and lateral pitch: 1 μm; and precision in the height direction: 0.01 μm; therefore, the number of height data pieces: 501×501). This data was used to find the inclination angle (inclination angle data) of the surface, and the inclination angle data was represented as the diagram showing contour map of equivalent inclination angle. In FIG. 6, orange portions have a largest inclination angle, and the inclination angle is decreased in the order of orange, yellow, yellowish green, sky blue and blue. Among the portions of each color, a brighter portion has a larger inclination angle. In the orange and yellow portions, the inclination angle of the interface is large and therefore, the light rays incident perpendicularly on the rear surface of the embossed film are refracted at a large angle of refraction. In the blue portions, the inclination angle of the interface is small and therefore, the light rays incident perpendicularly on the rear surface of the embossed film are refracted at a small angle of refraction.

Figure 7:
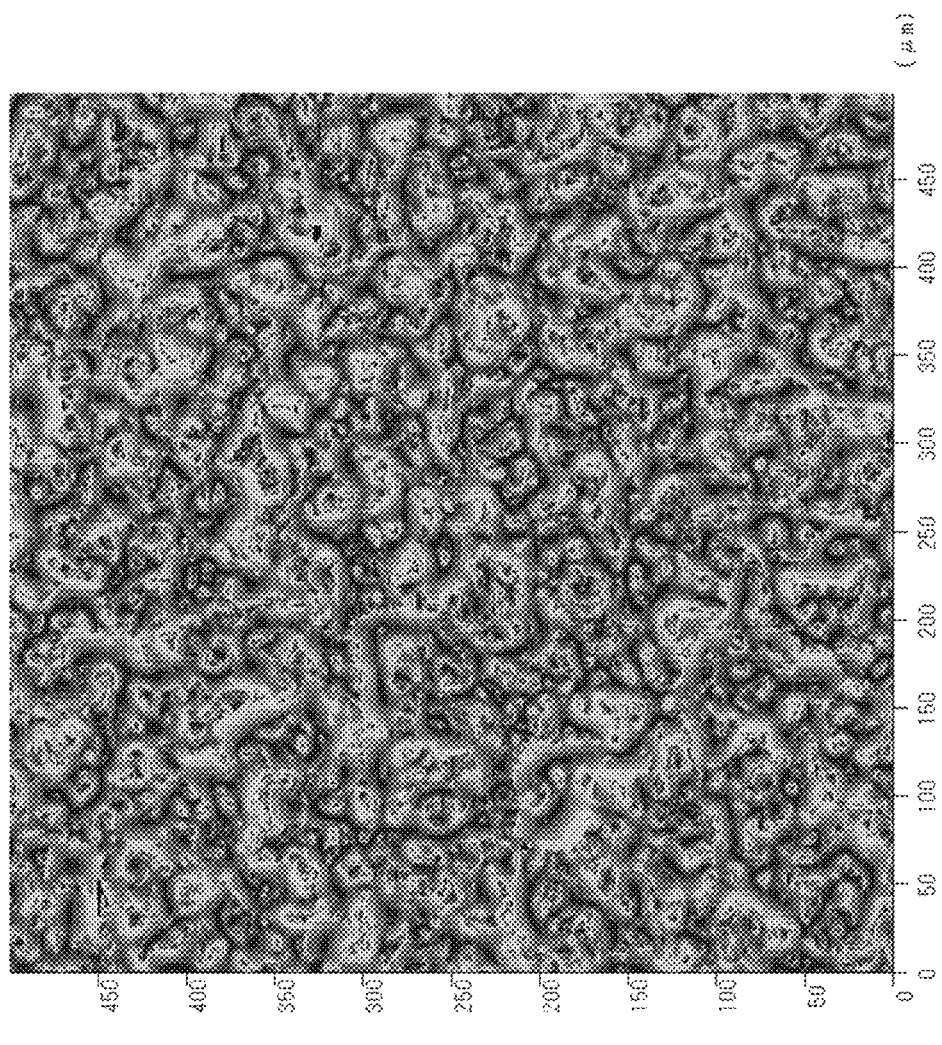
FIG. 7 shows contour map of equivalent inclination angle of the embossed surface of the example.

FIG. 7 was created as follows. From the three-dimensional shape data of the example used for creating FIG. 3 (measured area: 500 μm square; longitudinal and lateral pitch: 0.5 μm; and precision in the height direction: 0.01 μm; therefore, the number of height data pieces: 1001×1001), every other data piece was removed, so that the longitudinal and lateral pitch was 1 μm (measured area: 500 μm square; longitudinal and lateral pitch: 1 μm; and precision in the height direction: 0.01 μm; therefore, the number of height data pieces: 501×501). This data was used to find the inclination angle (inclination angle data) of the interface, and the inclination angle data was represented as the diagram showing contour map of equivalent inclination angle.

The inclination angle was calculated as follows. As shown in FIG. 10, based on the height data, namely, the two-dimensional matrix data of 501 rows by 501 columns (surface three-dimensional data obtained from a 500 μm-square measured area at a longitudinal and lateral pitch of 1 μm and a precision in the height direction of 0.01 μm), the inclination of a virtual plane (triangle) defined by points in a three-dimensional space, which was formed of three height information pieces (three matrix elements) adjacent to one another in the XY plane, was defined as the inclination (inclination angle) of the interface of a corresponding position. Therefore, four inclination angles are calculated from four points adjacent to one another in the XY plane which forms a square (there are four combinations of three points selected from the four points). Specifically, the calculation was performed as follows. An exterior product of two vectors defined by the triangle was calculated, a normal vector to the virtual plane was found, and the angle formed by the film substrate surface and the normal vector was defined as the inclination angle. The height data, namely, the two-dimensional matrix data, includes a matrix of 501 rows×501 columns. Therefore, the inclination angle data includes a matrix of 1000 rows×1000 columns.

The actual calculation was executed by use of the C programming language. The three-dimensional shape of the surface may be measured by use of an autofocus function, a confocal laser microscope or the like. It is commonly known that when the inclination angle is large, the found value may be clearly wrong or data itself may not be obtained. Such clearly wrong data was not used for the calculation of the inclination angle. FIG. 15 shows source codes created by the C programming language, for calculating the distribution of the number of times of the inclination angle of the tiny areas from the 501–501 data pieces, obtained by measuring the three-dimensional shape of the embossed matte surface at a resolution in the height direction of 0.01 μm, a longitudinal and lateral pitch of 1 μm and a visual field of 500 μm×500 μm. The error data was set to −10,000 in advance, which is an impossible value. The unit of the height data was millimeters.

Figure 14:
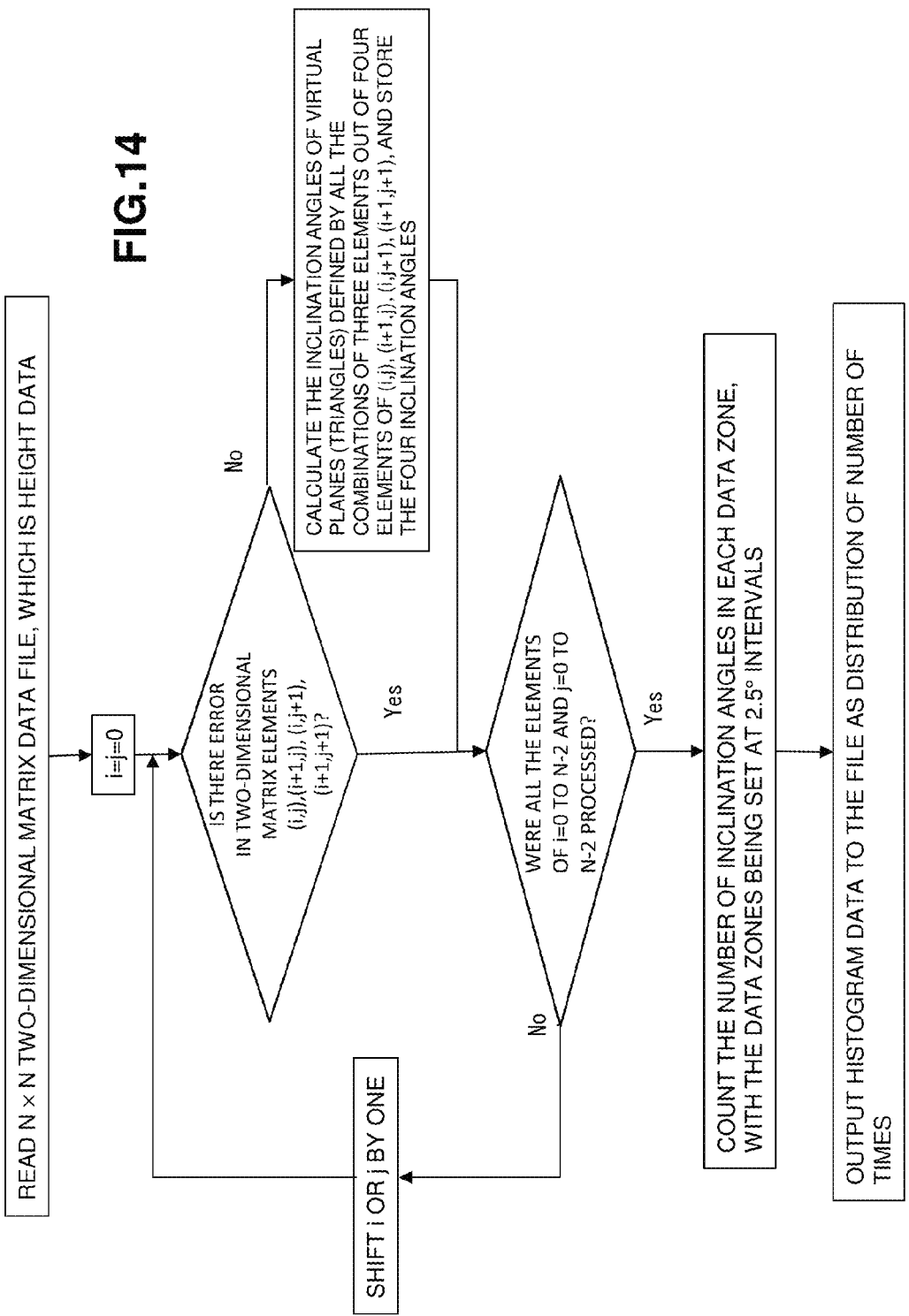
FIG. 14 shows an example of algorithm for calculating the distribution of the number of times of the inclination angles from three-dimensional data.

FIG. 14 is a flowchart showing the program algorithm. First, the height data arrayed two-dimensionally is read and stored on a memory. Next, it is check whether or not there is error data in each of an element of row 1×column 1, an element of row 1×column 2, an element of row 2×column 1, and an element of row 2×column 2. When there is error data, the column is shifted by one; namely, the process is performed on each of an element of row 1×column 2, an element of row 1×column 3, an element of row 2×column 2, and an element of row 2×column 3. When there is no error data, the angles of the four virtual planes formed of all of the four combinations of three points selected from the four points are calculated. Once being calculated, the angles are stored on a memory, the column is shifted by one, and substantially the same operation is repeated. In the case where the data is arrayed two-dimensionally, namely, in N rows×N columns, when the process on the Nth column is finished, the column is returned to the first column and the row is shifted by one. When the process on the (N−1)th row×the (N−1)th column is finished, the inclination angle data stored on the memory is used to count the numbers of times belonging to each of data zones, which are set to at 2.5° intervals, and the results are output to a file.

In this program, for example, three-dimensional shape data having a file name of M01_raw0.1.txt (height information; matrix of 501 rows×501 columns) is read, and the distribution of the number of times of the inclination angle having a file name of result.txt is output. For example, Table 2 shows the inclination angle distribution results in an area of 500 μm×500 μm of the surface of the light diffusion film of the conventional product. Among the data zones of the inclination angle data shown in Table 2, the first zone, for example, is the data zone of 0° or greater and 2.5° or less. In Table 2, the second column from the right represents the number of times. The frequency (%) is obtained by dividing the number of times in each data zone by a total sum of the numbers of times of all the zones (see the lowest row) and multiplying the result by 100. As can be seen, the "frequency" in the present specification refers to the ratio of the number of times in each data zone of the inclination angle data with respect to the total sum of the numbers of times of all the data zones (0 to 90 degrees).

TABLE 2

| Zone No. | Data zone (degrees) | Number of Times | Frequency (%) |
|---|---|---|---|
| 1 | 0~2.5 | 129799 | 13.0 |
| 2 | 2.5~5.0 | 232937 | 23.3 |
| 3 | 5.0~7.5 | 233210 | 23.3 |
| 4 | 7.5~10.0 | 152111 | 15.2 |
| 5 | 10.0~12.5 | 101912 | 10.2 |
| 6 | 12.5~15.0 | 58367 | 5.8 |
| 7 | 15.0~17.5 | 36939 | 3.7 |
| 8 | 17.5~20.0 | 20558 | 2.1 |
| 9 | 20.0~22.5 | 12335 | 1.2 |
| 10 | 22.5~25.0 | 7586 | 0.8 |
| 11 | 25.0~27.5 | 4561 | 0.5 |
| 12 | 27.5~30.0 | 2843 | 0.3 |
| 13 | 30.0~32.5 | 1692 | 0.2 |
| 14 | 32.5~35.0 | 1110 | 0.1 |
| 15 | 35.0~37.5 | 762 | 0.1 |
| 16 | 37.5~40.0 | 538 | 0.1 |
| 17 | 40.0~42.5 | 382 | 0.0 |
| 18 | 42.5~45.0 | 336 | 0.0 |
| 19 | 45.0~47.5 | 286 | 0.0 |
| 20 | 47.5~50.0 | 220 | 0.0 |
| 21 | 50.0~52.5 | 180 | 0.0 |
| 22 | 52.5~55.0 | 188 | 0.0 |
| 23 | 55.0~57.5 | 129 | 0.0 |
| 24 | 57.5~60.0 | 82 | 0.0 |
| 25 | 60.0~62.5 | 100 | 0.0 |
| 26 | 62.5~65.0 | 73 | 0.0 |
| 27 | 65.0~67.5 | 65 | 0.0 |
| 28 | 67.5~70.0 | 42 | 0.0 |
| 29 | 70.0~72.5 | 50 | 0.0 |
| 30 | 72.5~75.0 | 69 | 0.0 |
| 31 | 75.0~77.5 | 18 | 0.0 |
| 32 | 77.5~80.0 | 20 | 0.0 |
| 33 | 80.0~82.5 | 0 | 0.0 |
| 34 | 82.5~85.0 | 0 | 0.0 |
| 35 | 85.0~87.5 | 0 | 0.0 |
| 36 | 87.5~90.0 | 0 | 0.0 |
| Total sum of Numbers of Times | — | 999500 | — |

Figure 8:
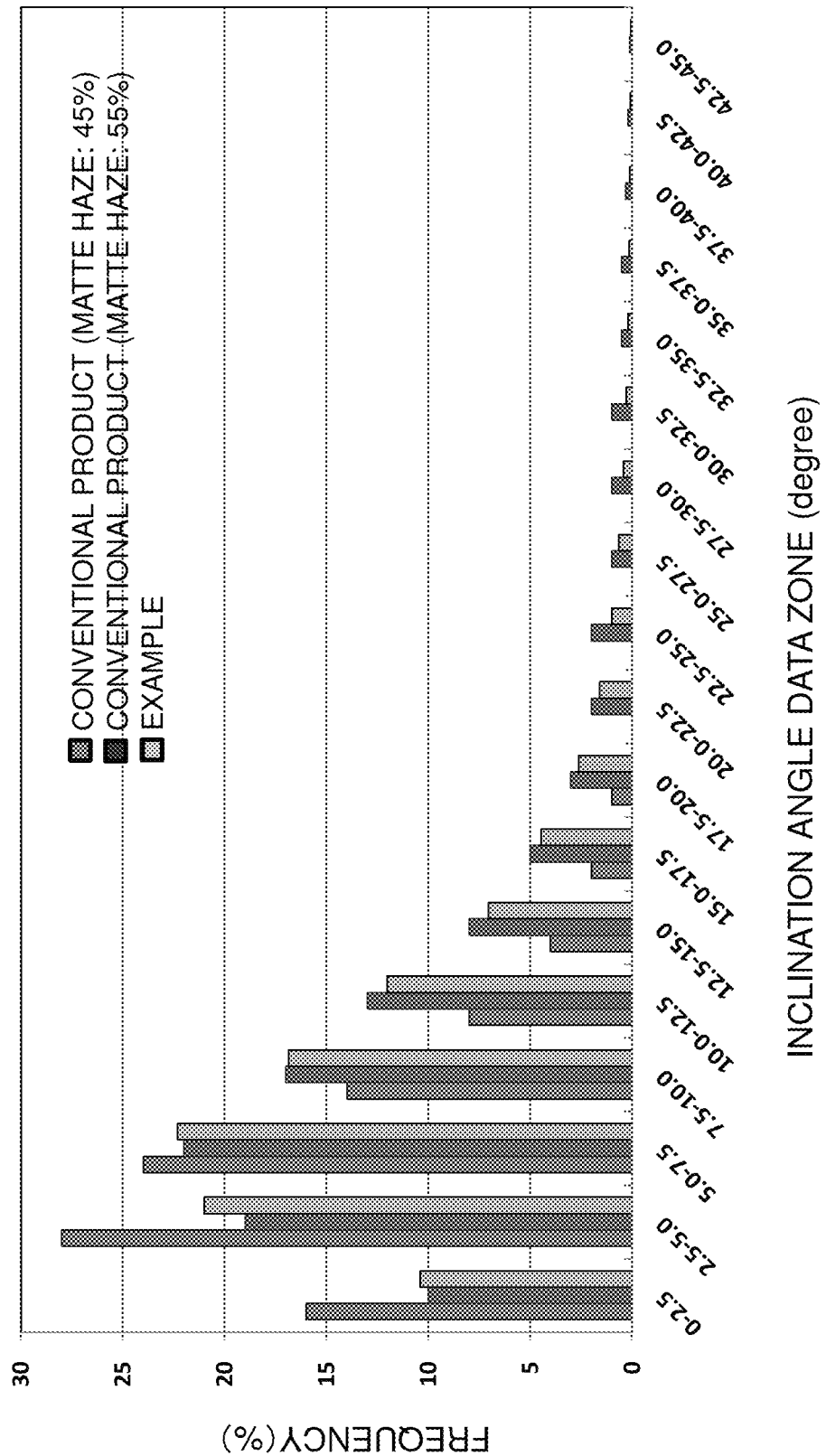
FIG. 8 shows inclination angle frequency (histogram) of the embossed surface of each the conventional product (two products having the upper limit matte haze and the lower limit matte haze within the product specifications) and the example.

FIG. 8 shows the occurrence frequency (histogram) of a group of inclination angles at the optical interfaces in tiny areas found by the above-described technique. The data zones were set at 2.5° intervals from 0°. Specifically, the frequencies of the following zones listed from the lowest inclination angle were found: frequency of the data zone of 0° or greater and less than 2.5°, frequency of the data zone of 2.5° or greater and less than 5.0°, frequency of the data zone of 5.0° or greater and less than 7.5°, frequency of the data zone of 7.5° or greater and less than 10.0°, frequency of the data zone of 10.5° or greater and less than 12.5°, frequency of the data zone of 12.5° or greater and less than 15.0°, frequency of the data zone of 15.0° or greater and less than 17.5°, frequency of the data zone of 17.5° or greater and less than 20.0°, frequency of the data zone of 20.0° or greater and less than 22.5°, frequency of the data zone of 22.5° or greater and less than 25.0°, frequency of the data zone of 25.0° or greater and less than 27.5°, frequency of the data zone of 27.5° or greater and less than 30.0°, frequency of the data zone of 30.0° or greater and less than 32.5°, frequency of the data zone of 32.5° or greater and less than 35.0°, frequency of the data zone of 35.0° or greater and less than 37.5°, frequency of the data zone of 37.5° or greater and less than 40.0°, frequency of the data zone of 40.0° or greater and less than 42.5°, and frequency of the data zone of 42.5° or greater and less than 45.0°. The data zones of 45.0° or greater had an occurrence frequency of substantially close to zero and therefore were not evaluated.

Figure 13:
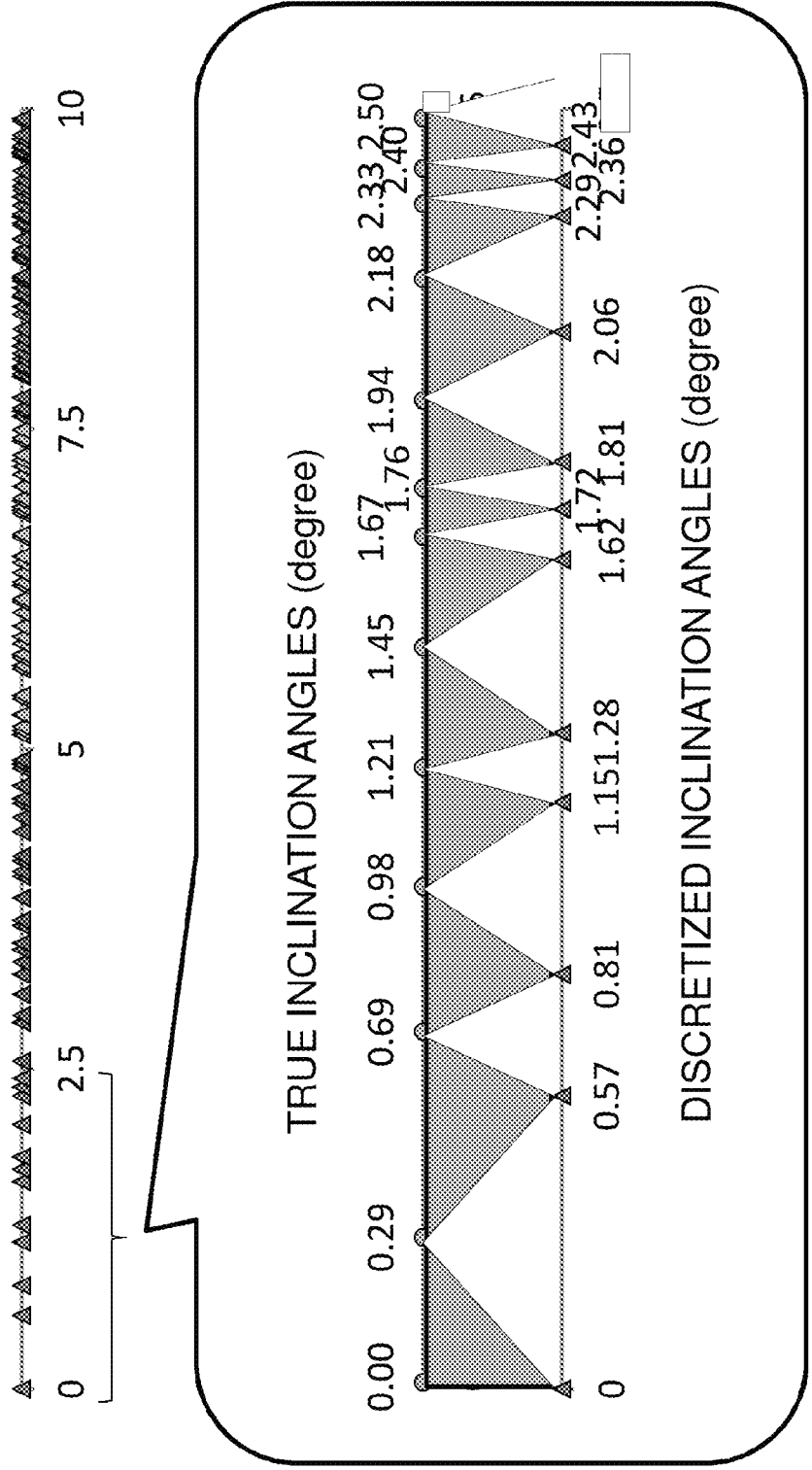
FIG. 13 shows discretization of inclination angles by digital three-dimensional shape data.

The three-dimensional shape data of the surface of the embossed matte film was acquired at a resolution in the height direction of 0.01 μm and a longitudinal and lateral pitch of 0.5 μm, and therefore, the inclination angles found by the calculation are discretized. As shown in FIG. 13, the inclination angles in the range of 0° to 0.29° are represented by 0°, the inclination angles in the range of 0.29° to 0.69 are represented by 0.57°, and the inclination angles in the range of 0.69° to 0.98° are represented by 0.81°. The longitudinal and lateral pitch is fixed at 1 μm. Therefore, whether each of the inclination angles in the vicinity of 0.29°, 0.69° and 0.98°, which are the borders between the ranges, is represented by a value smaller than itself or a value larger than itself is considered to be a probability event that depends on the numerical value of the height data derived from a measurement device having a resolution in the height direction of 0.01 μm (for example, depends on whether the actual height of 0.015 μm is determined as 0.01 μm or 0.02 μm). Therefore, when the histogram is created with data zones that are set at too small intervals, the phenomenon that a data zone which should be present may be included in an adjacent data zone occurs and is not ignorable. This problem is especially serious for areas of low inclination angles, in which the discretization degree is high. This problem is especially serious in the example according to the present invention and the conventional product because the embossed surfaces have many small inclination angles. When the data zones are set at intervals larger than 2.5°, there is an undesirable possibility that a feature of the inclination angle distribution cannot be seized. In consideration of these factors, the data zones were set at 2.5° intervals in the example.

The conventional product and the product according to the present invention shown in FIG. 8 were processed as follows. Regarding each of samples in the same lot, inclination angles of different 500 μm-square areas were measured, and a histogram was created based on the sum of the numbers of times of each data zone of the measurement areas. The measurement was continued until the profile of the histogram became asymptotic (converged). Specifically, the measurement was performed on ten samples in different 500 μm-square areas, and it was confirmed that the profile of the histogram became asymptotic (converged).

Referring to FIG. 8, the matte haze of 45% and the matte haze of 55% are the upper limit matte haze and the lower limit matte haze within the specifications of the conventional products. Namely, the red column and blue column respectively represent the upper limit and the lower limit of the asymptotic values of the frequency of each data zone (the percentage or ratio of the number of times in each data zone with respect to the total sum of the numbers of times in all the data zones). If the asymptotic value of the frequency of the film of the example is between the upper limit and the lower limit, the film of the example is considered to have good optical (luminous intensity distribution) characteristics. Such a film of the example can be shipped as a product and industrially used as an optical film of a backlight unit in a liquid crystal TV. In FIG. 8, the three columns provided for each data zone represent, from the left, the conventional product (matte haze: 45%), the conventional product (matte haze: 55%) and the example.

The product range of the inclination angle frequency (matte haze values of 45% to 55% are within the product range) can be generally represented numerically as in Table 3 by use of the inclination angle frequency shown in the histogram. If the frequency in each inclination angle data zone is encompassed in the corresponding range in Table 3, the film is considered to have good optical characteristics of a predefined level.

TABLE 3

| Zone No. | Data zone (degrees) | Frequency range (%) |
|---|---|---|
| 1 | 0~2.5 | 9% or greater, 16% or less |
| 2 | 2.5~5.0 | 18% or greater, 28% or less |
| 3 | 5.0~7.5 | 21% or greater, 24% or less |
| 4 | 7.5~10.0 | 14% or greater, 18% or less |
| 5 | 10.0~12.5 | 8% or greater, 13% or less |
| 6 | 12.5~15.0 | 4% or greater, 8% or less |
| 7 | 15.0~17.5 | 2% or greater, 5% or less |
| 8 | 17.5~20.0 | 1% or greater, 3% or less |
| 9 | 20.0~22.5 | 2% or less |
| 10 | 22.5~25.0 | 2% or less |
| 11 | 25.0~27.5 | 1% or less |
| 12 | 27.5~30.0 | 1% or less |
| 13 | 30.0~32.5 | 1% or less |
| 14 | 32.5~35.0 | 0.5% or less |
| 15 | 35.0~37.5 | 0.5% or less |
| 16 | 37.5~40.0 | 0.3% or less |
| 17 | 40.0~42.5 | 0.2% or less |
| 18 | 42.5~45.0 | 0.1% or less |

The frequencies of the example shown in FIG. 8 are encompassed in the above-shown ranges. The film of the example succeeds the excellent optical characteristics of the conventional products of the applicant of the present application. The example shown in FIG. 8 is one example having the frequencies in the above-shown ranges. A product embodying the present invention is considered to have a frequency value in each data zone encompassed in the corresponding numerical range.

Figure 9:
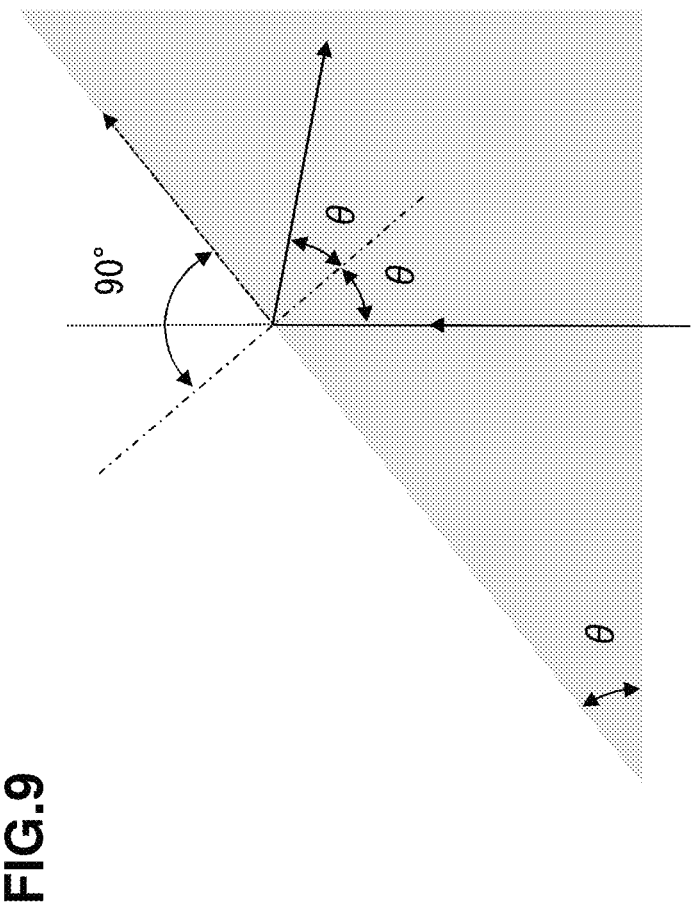
FIG. 9 shows an inclination angle which fulfills the condition of total reflection.

A product embodying the present invention and also the conventional product have a feature that the frequency is 0.5% or less in the inclination angle data zones of 32.5° or greater (see Table 3, the 14th zone (zone No. 14) and below). As shown in FIG. 9, the inclination angle of a PC/air interface (refractive index of PC: 1.58; refractive index of air: 1.0) which fulfills the condition that the light rays incident perpendicularly on the rear surface of the embossed matte surface makes total reflection is 39.3° (the above-mentioned refractive indexes are obtained when the wavelength of sodium d emission line is 587.6 nm). When the inclination angle is equal to or higher than 39.3°, the light rays are reflected and returns, which decreases the total reflection transmittance. Therefore, regarding the total reflection, it is preferable that the number of the inclination angle components equal to or higher than about 39.3° is small.

As described above in the "Reduction of glare" and "Succession of optical characteristics of the conventional product" parts, a novel embossed matte film causing little glare while succeeding the good optical characteristics of the film of the conventional product can be specified by controlling the size of the unit patterns which make up the entire pattern by use of the RSm value and controlling the frequency distribution of the inclination angles of tiny areas of the embossed matte pattern. Conventionally, the irregular pattern is evaluated by one geometric aspect such as Ra (arithmetic average height), Ry (maximum height), Rz (average height of ten samples), RSm (average length of roughness curve element) or the like. Now, a novel technique is realized of formulating the irregular pattern by use of the inclination angle distribution and thus measuring and defining the surface shape of the film three-dimensionally. This novel technique realizes definition of the surface shape of an optical film having an irregular pattern that can fully guarantee good optical characteristics.

Examples

Hereinafter, the present invention will be described by way of examples. The present invention is not limited to these examples in any way. A method for producing a light diffusion film in an example according to the present invention is as follows.

(1) Production of a Light Diffusion Film in the Example

A polycarbonate resin (trade name: Iupilon S-3000 produced by Mitsubishi Engineering-Plastics Corporation) was melt-extruded at 290° C. by an air-bent type 50 mm mono-axial extruder and a T-die. The extruded melt film was nipped by a first cooling roll having a diameter of 202 mm and formed of silicone rubber and an embossed metal second cooling roll having a diameter of 400 mm. The nipping linear pressure was 230 N/cm. Next, the surface of the film was provided with an emboss pattern, and the film was cooled. Then, the film was passed on a metal third cooling roll having a mirror surface. The film was drawn by a drawing roll to form an embossed matte film having a thickness of 130 μm and having one embossed surface. In this process, the temperature of the first cooling roll was set to 65° C., the temperature of the second cooling roll was set to 145° C., the temperature of the third cooling roll was set to 130° C., and the rotation rate of the cooling rolls was set to 10 m/min.

The characteristics of the obtained light diffusion film in the example were evaluated as follows.

(2) Total Light Transmittance and Haze

The measurement was performed by use of a haze meter HM-150 produced by Murakami Color Research Laboratory Co., Ltd.

(3) Luminous Intensity Distribution Characteristic

The measurement was performed by use of a gonio-photometer GP200 produced by Murakami Color Research Laboratory Co., Ltd.

(4) Measurement of the Three-Dimensional Shape of the Film Surface and the Average Length RSm of the Roughness Curve Element The measurement was performed by use of a non-contact three-dimensional measurement device NH-3N produced by Mitaka Kohki Co., Ltd. The resolution in the height direction of this device is fixed at 0.01 μm.

For the confirmation of the approved contours and the ray-tracing calculation, the longitudinal and lateral pitch was set to 0.5 μm.

For the calculation of the inclination angles, the longitudinal and lateral pitch was set to 1.0 μm.

(5) Ray-Tracing Calculation

The calculation was performed by use of an illumination design analyzing software LightTools produced by Optical Research Associates.

Now, the characteristics of the light diffusion film in the example that were measured by the above-described evaluation methods are as shown in Table 4. These characteristics are also shown in FIG. 8 referred to above as the characteristics of the example. The frequency in each data zone in the example is encompassed in the corresponding range shown in Table 3. Thus, the light diffusion film in the example has been confirmed to have good optical characteristics.

TABLE 4

| Zone No. | Data zone (degrees) | Frequency range (%) |
|---|---|---|
| 1 | 0~2.5 | 10.4 |
| 2 | 2.5~5.0 | 19.7 |
| 3 | 5.0~7.5 | 22.3 |
| 4 | 7.5~10.0 | 16.9 |
| 5 | 10.0~12.5 | 12.0 |
| 6 | 12.5~15.0 | 7.1 |
| 7 | 15.0~17.5 | 4.5 |
| 8 | 17.5~20.0 | 2.6 |
| 9 | 20.0~22.5 | 1.6 |
| 10 | 22.5~25.0 | 1.0 |
| 11 | 25.0~27.5 | 0.7 |
| 12 | 27.5~30.0 | 0.4 |
| 13 | 30.0~32.5 | 0.3 |
| 14 | 32.5~35.0 | 0.1 |
| 15 | 35.0~37.5 | 0.1 |
| 16 | 37.5~40.0 | 0.1 |
| 17 | 40.0~42.5 | 0.1 |
| 18 | 42.5~45.0 | 0.1 |

The average length RSm of the roughness curve element of the film surface was measured at 10 positions. It was confirmed that when the measured length was 50 mm, the values of RSm at all the ten positions were made asymptotic to about 50 μm.

The emboss pattern on the rear surface of the film (transferred from the pattern on the surface of the first cooling roll having rubber elasticity) was optically eliminated by use of a refractive index matching liquid and a glass plate, and the rear surface of the film was illuminated by use of an LED light source to evaluate the glare. No glare was recognized.

The invention claimed is:

1. A light diffusion film formed of polycarbonate that has an irregular three-dimensional surface shape for diffusing light due to refraction wherein:

an average length RSm of a roughness curve element of a surface of the film has a value in the range of 70 μm or less (measured in conformity to JIS B 0601 (2001) until the RSm value is asymptotic, with a cutoff value being 0.8 mm), three-dimensional data is measured on the surface at a film planer direction (XY direction) pitch of 1 μm and a film thickness direction pitch (Z direction) of 0.01 μm or less, a virtual plane is defined by three points adjacent to one another on the XY plane, an inclination angle of the virtual plane is an angle formed by the normal vector to the virtual plane and the normal vector to the film substrate surface, data zones are set at 2.5° intervals, a number of times in each data zone is obtained from data of the inclination angle of the virtual plane obtained from the three-dimensional data, and a frequency of which unit is a percentage (%) is calculated as a ratio of the number of times in each data zone to the total sum of the numbers of times in all the data zones, an asymptotic value by large area data of the frequency is:

9% or greater and 16% or less in a data zone of 0° or greater and less than 2.5°, 18% or greater and 28% or less in a data zone of 2.5° or greater and less than 5.0°, 21% or greater and 24% or less in a data zone of 5.0° or greater and less than 7.5°, 14% or greater and 18% or less in a data zone of 7.5° or greater and less than 10.0°, 8% or greater and 13% or less in a data zone of 10.0° or greater and less than 12.5°, 4% or greater and 8% or less in a data zone of 12.5° or greater and less than 15.0°, 2% or greater and 5% or less in a data zone of 15.0° or greater and less than 17.5°, 1% or greater and 3% or less in a data zone of 17.5° or greater and less than 20.0°, 2% or less in a data zone of 20.0° or greater and less than 22.5°, 2% or less in a data zone of 22.5° or greater and less than 25.0°, 1% or less in a data zone of 25.0° or greater and less than 27.5°, 1% or less in a data zone of 27.5° or greater and less than 30.0°, 1% or less in a data zone of 30.0° or greater and less than 32.5°, 0.5% or less in a data zone of 32.5° or greater and less than 35.0°, 0.5% or less in a data zone of 35.0° or greater and less than 37.5°, 0.3% or less in a data zone of 37.5° or greater and less than 40.0°, 0.2% or less in a data zone of 40.0° or greater and less than 42.5°, and 0.1% or less in a data zone of 42.5° or greater and less than 45.0°.

* * * * *